United States Patent [19]

Nonomura et al.

[11] Patent Number: 5,381,251
[45] Date of Patent: Jan. 10, 1995

[54] OPTICAL SWITCH ELEMENT AND A LIQUID CRYSTAL LIGHT DIRECTIONAL COUPLER USED IN THE OPTICAL SWITCH ELEMENT

[75] Inventors: Keisaku Nonomura, Nara; Mitsuhiro Shigeta, Kyoto, both of Japan

[73] Assignee: Sharp Kabushiki Kaisha, Osaka, Japan

[21] Appl. No.: 44,144

[22] Filed: Apr. 7, 1993

[30] Foreign Application Priority Data

Apr. 7, 1992 [JP] Japan ................................. 4-085429

[51] Int. Cl.[6] ......................... G02F 1/13; G02F 1/137
[52] U.S. Cl. ........................................ 359/39; 359/94; 359/100; 385/1
[58] Field of Search ................ 359/42, 38, 39, 94, 359/100, 245, 246; 385/4, 8, 9, 16, 17

[56] References Cited

U.S. PATENT DOCUMENTS

| | | | |
|---|---|---|---|
| 3,920,314 | 11/1975 | Yajima et al. | 385/9 |
| 4,721,352 | 1/1988 | Sorin et al. | 359/42 |
| 4,813,771 | 3/1989 | Handschy et al. | 359/42 |
| 4,836,657 | 6/1989 | Gunji et al. | 359/38 |

FOREIGN PATENT DOCUMENTS

| | | |
|---|---|---|
| 57-142622 | 9/1982 | Japan . |
| 1-156724 | 6/1989 | Japan . |
| 1-173016 | 7/1989 | Japan . |
| WO87/06019 | 10/1987 | WIPO ................ 359/42 |

Primary Examiner—William L. Sikes
Assistant Examiner—Huy Mai
Attorney, Agent, or Firm—Morrison & Foerster

[57] ABSTRACT

An optical switch element for selectively transmitting or shielding light from a first optical wave guide to a second optical wave guide is disclosed. The optical switch element includes a first optical switch portion and a second optical switch portion. The first optical switch portion includes: a part of said first optical wave guide; a first liquid crystal layer optically connected to said part of said first optical wave guide; a first part of said second optical wave guide optically connected to said first liquid crystal layer; and first voltage applying means for applying voltage to said first liquid crystal layer to change a refractive index of said first liquid crystal layer. The second optical switch portion includes: a second part of said second optical wave guide; a second liquid crystal layer optically connected to said second part of said second optical wave guide; and second voltage applying means for applying voltage to said second liquid crystal layer to change a refractive index of said second liquid crystal layer. In a case where light is transmitted from said first optical wave guide to said second optical wave guide, said first optical switch portion is in a transmitting state, and said second optical switch portion is in a shielding state, and in another case where light is shielded from said first optical wave guide to said second optical wave guide, said first optical switch portion is in a shielding state, and said second optical switch portion is in a transmitting state.

13 Claims, 8 Drawing Sheets

OPTICAL SWITCH ELEMENT AND A LIQUID CRYSTAL LIGHT DIRECTIONAL COUPLER USED IN THE OPTICAL SWITCH ELEMENT

BACKGROUND OF THE INVENTION

1. Field of the Invention

The present invention relates to an optical switch element and a liquid crystal light directional coupler which can be used in an optical transmission apparatus or an optical information processing apparatus.

2. Description of the Related Art

Now, a flat panel display device which performs a display based on a different principle from that of a conventional cathode ray tube (CRT) is widely used as a display in a document editing apparatus such as a word processor, or in an electronic apparatus such as a personal computer. Developments are pursued in the future application of such a flat panel display device as a display used in a high definition television receiver or in a high-performance engineering work station (EWS).

As such a flat panel display device, an electroluminescence panel (ELP), an plasma display panel (PDP), a liquid crystal display (LCD) or the like is known. Among these known display devices, the LCD is the most promising in terms of high accommodation to full color display, the application in conjunction with a large scale integrated circuit (LSI), and the like.

There two types of LCDs depending on the construction and the method for driving the display medium. One is an LCD of simple matrix driving type. The other is an LCD of active matrix driving type. In the LCD of simple matrix driving type, on surfaces of a pair of glass substrates which face each other, stripe-like electrodes are formed, respectively. The glass substrates are combined in such a manner that the stripe-like electrodes on the glass substrates are perpendicular to each other. Into a space between the glass substrates, nematic liquid crystal is injected. A display is realized by using the abrupt changing ability in the optical characteristics between the display state and the non-display state of the nematic liquid crystal.

The LCD of active matrix driving type has a construction in which pixels are used with nonlinear elements. The LCD of active matrix driving type performs the display by using the switching characteristics of the respective nonlinear elements. Therefore, as compared with the LCD of simple matrix driving type, the LCD of active matrix driving type has a lower dependence on the abruptness of changing in the optical characteristics of the liquid crystal, thereby realizing a display device with a high contrast and high-speed response.

The nonlinear elements are classified into two types. One is a two-terminal element, and the other is a three-terminal element. As the two-terminal type nonlinear element, an MIM (metal-insulator-metal) element, a diode and the like are known. As the three-terminal type nonlinear element, an a-Si TFT (amorphous silicon thin film transistor) element, a p-Si TFT (polysilicon thin film transistor) element, and the like are known.

In the LCD of active matrix driving type, parasitic capacitances are generated in the nonlinear elements and scanning lines. This causes problems such that the decrease in contrast, the occurrence of persistence, the reduction in panel lifetime, and the like. In the recent future, the display panel will be increased in size. The large-sized panel necessitates longer wirings. As a result, the wiring resistance is increased, and the delay in signal is increased by the combination of the parasitic capacitance and the wiring resistance. This causes a problem in that the uniformity and the high contrast of the display are further degraded.

In order to eliminate the above problems, the waveforms of the driving pulses for the display in the respective pixels are analyzed. However, it is difficult to logically analyze the waveforms in detail due to the nonlinearity of the switching elements.

Figure 7:
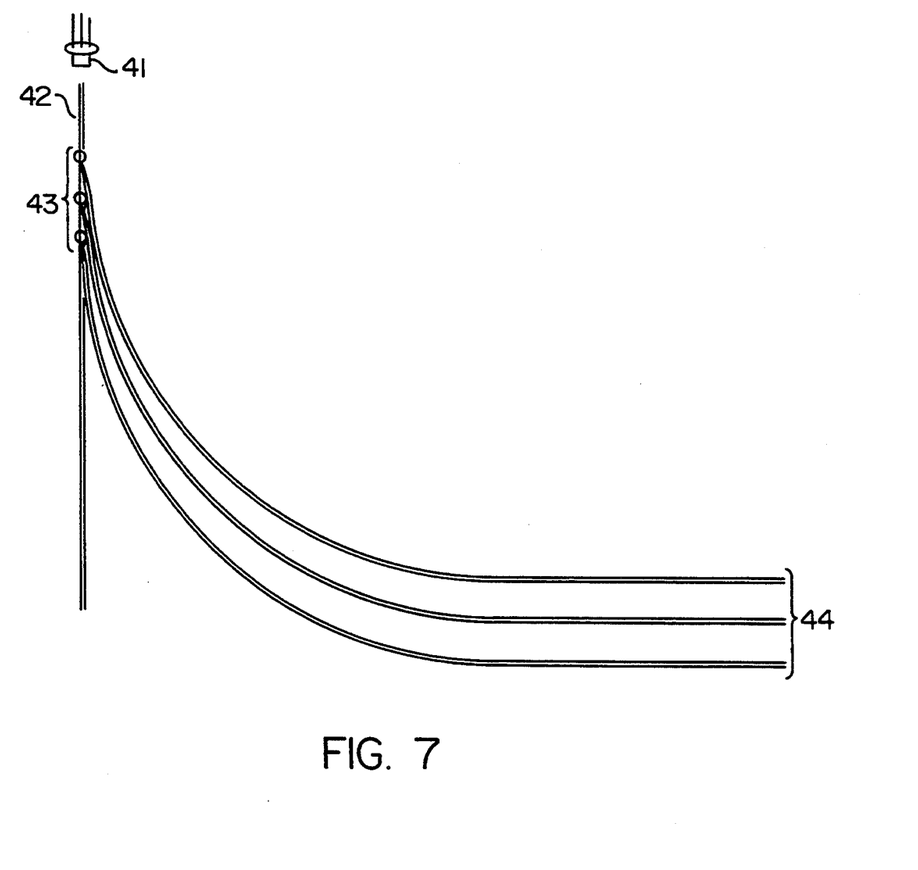
FIG. 7 is a plan view illustrating the principle of the optical scanning system.

On the other hand, as is shown in FIG. 7, light from a light source 41 to an optical wave guide 42 is branched by light branching elements 43, so that the branched light beams are transmitted through a plurality of row optical wave guides 44, respectively. If the above optical scanning manner is used, the above-mentioned parasitic capacitances between the nonlinear elements associated with the pixels and the electrical wirings can be remarkably reduced. Therefore, by using the above optical scanning manner, the above problem of signal delay is eliminated, whereby the display device can be readily made larger. The light branching element 43 is an optical switch element which passes or shields the light from the optical wave guide 42 to the row optical wave guide 44.

There are two types of optical switch elements. One is of mechanical type in which an optical path is switched by mechanically driving a fiber, a prism or the like. The other one is of electronic type in which an electro-optic effect and an acousto-optic effect of $LiNbO_3$, $As_2S_3$, etc. are utilized. An optical switch element of the electronic type has no mechanically movable section, so that it offers high reliability. Especially, in recent years, an optical switch element of the electronic type which uses liquid crystal is attractive. For example, there is an optical switch element of the electronic type, i.e., a so-called light directional coupler in which liquid crystal and an optical wave guide are used in combination, which is described in Japanese Laid-Open Patent Publication No. 57-142622 (Applicant: Nippon Telegraph and Telephone Public Corporation).

Figure 2A:
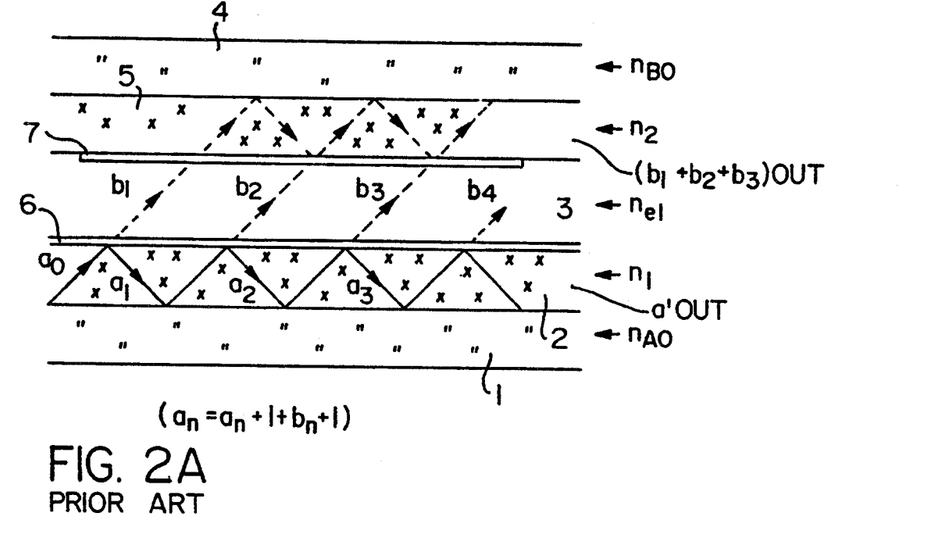
FIG. 2A is a cross-sectional view showing a structure of a first optical switch portion in the optical switch element of FIG. 1 and also showing a structure of part of a conventional optical switch element in one state.
Figure 2B:
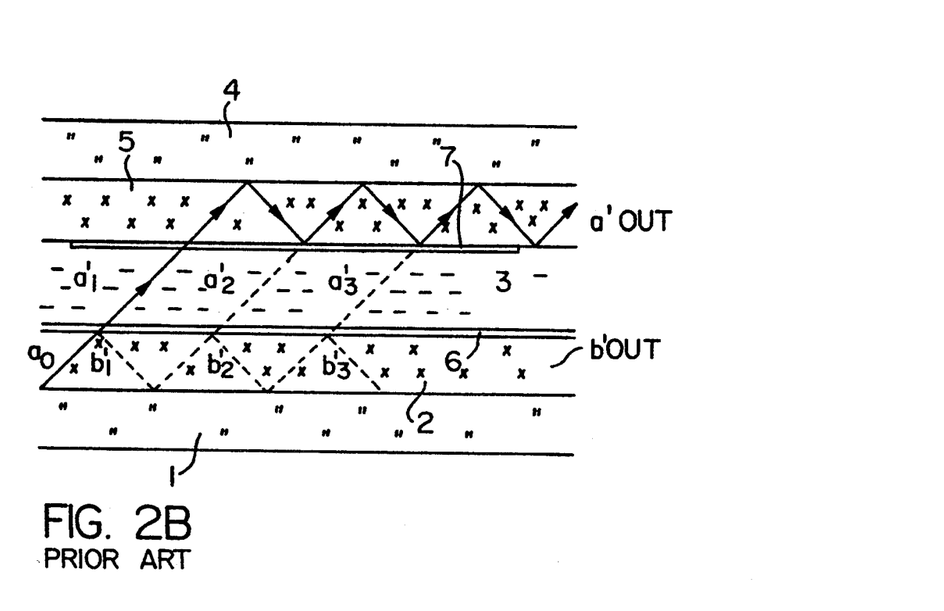
FIG. 2B is a cross-sectional view showing a structure of the first optical switch portion in the optical switch element of FIG. 1 and also showing a structure of the part of the conventional optical switch element in another state.

FIGS. 2A and 2B are cross-sectional views for illustrating a structure and operation of a conventional optical switch element using liquid crystal. Referring to these figures, a first optical wave guide 2 is formed on a glass substrate 1, and a common electrode 6 is formed thereon. A second optical wave guide 5 is formed on a counter glass substrate 4, and a segment electrode 7 is formed thereon. A liquid crystal layer 3 is formed between the common electrode 6 and the segment electrode 7. The common electrode 6 and the segment electrode 7 are made of transparent conductive films. These electrodes are sufficiently thin, so as not to affect a relationship between each of the optical wave guides 2 and 5 and the liquid crystal layer 3, i.e., total reflection or scattering.

FIG. 2B shows the light transmission direction from the first optical wave guide 2 to the second optical wave guide 5, when voltage is applied to the segment electrode 7 and the common electrode 6 of the optical switch element. In this case, refractive indexes of the respective component materials of the optical switch element satisfy first conditions of $n_{A0} < n_1 < n_{e1} < n_2$, and $n_2 > n_{B0}$, or second conditions of $n_{e1} < n_1$, $n_{e1} < n_2$, $n_1 > n_{A0}$, $n_2 > n_{A0}$, $n_1 > n_{B0}$ and $n_2 > n_{B0}$ (where $n_{e1}$, $n_{A0}$, $n_1$, $n_{B0}$ and $n_2$ are refractive indexes of the liquid crystal layer 3, the glass substrate 1, the first optical wave guide 2, the counter glass substrate 4 and the second optical wave guide 5, respectively). At a first scattering, 99.9% of an incident light beam $a_0$ is transmitted out of the first optical wave guide 2 (such a light beam is referred to as $a'_1$). The remaining 0.1% of $a_0$ is still in the first optical wave guide 2 (such a light beam is referred to as $b'_1$). At a second scattering, 99.9% of $b'_1$ is scattered and 0.1% of $b'_1$ is still in the first optical wave guide 2. After the second scattering, 0.0000001% of $a_0$ ($b'_{out}$) remains in the first optical wave guide 2, and 99.9999999% of $a_0$ is scattered. The scattered light is attenuated to be about 70% due to a propagation loss in the liquid crystal layer 3 or the like. The attenuated light ($a'_{out}$) is guided to the second optical wave guide 5.

FIG. 2A shows a case where no voltage is applied to the optical switch element. In this case, refractive indexes of the respective component materials satisfy conditions of $n_{A0}<n_1$, $n_1>n_{e1}$, $n_{B0}<n_2$ and $n_2>n_{e1}$. The refractive index $n_{e1}$ is smaller than that in the case where voltage is applied. Therefore, the incident light beam $a_0$ is repeatedly and totally reflected in the first optical wave guide 2. At each total reflection, 0.1% of a light beam is scattered. Although the light is gradually attenuated by 0.1% in the order of $a_1$, $a_2$ and $a_3$, approximately 100% of the incident light beam $a_0$ ($a_{out}$) is guided in the first optical wave guide 2. The scattered light beams (about 0.1%) $b_1$, $b_2$ and $b_3$ scattered at an interface between the first optical wave guide 2 and the liquid crystal layer 3 are attenuated to be 0.07% due to the propagation loss in the liquid crystal layer 3. The scattered light beams $b_1$, $b_2$ and $b_3$ are guided to the second optical wave guide 5 and are sequentially summed up, so as to be totally 0.2%, which constitutes leakage light.

Because of the leakage light, the conventional optical switch element has the S/N ratio of 26 dB. Therefore, the conventional optical switch element has a problem of crosstalk in which the optical signal transmitted through the first optical wave guide 2 is leaked at the optical switch element to the second optical wave guide 5. Moreover, since the conventional optical switch element uses nematic liquid crystal, there is another problem in that the switching rate is several milliseconds, i.e., the response speed is relatively low.

Another prior art for optical scanning uses a light directional coupler as the above-mentioned light branching element. The light directional coupler is mainly used for branching an optical signal in the optical communication field. For the optical wave guide, an optical fiber, glass optical wave guide, a semiconductor optical wave guide or the like is used. As a material for the light directional coupler type switch element, Ti:-LiNbO₃ is known. Moreover, a (4×4) or (8×8) matrix switch of cross connection type in which light directional couplers are integrated is now being developed.

Still another prior art uses a liquid crystal light directional coupler as the light branching element. By the conventional liquid crystal light directional coupler, a coupling length is about several millimeters. Therefore, when the optical scanning is performed in the display device, and the size of each of the liquid crystal light directional coupler is assumed to be equal to the above length, the row optical wave guides extending along a row direction across the liquid crystal light directional couplers from the main optical wave guide extending along a column direction cannot be formed in high density, which constitutes a problem.

SUMMARY OF THE INVENTION

According to the invention, the optical switch element for selectively transmitting or shielding light from a first optical wave guide to a second optical wave guide is provided, and the optical switch element includes a first optical switch portion and a second optical switch portion. The first optical switch portion includes: a part of the first optical wave guide; a first liquid crystal layer optically connected to the part of the first optical wave guide; a first part of the second optical wave guide optically connected to the first liquid crystal layer; and first voltage applying means for applying voltage to the first liquid crystal layer to change a refractive index of the first liquid crystal layer. The second optical switch portion includes: a second part of the second optical wave guide; a second liquid crystal layer optically connected to the second part of the second optical wave guide; and second voltage applying means for applying voltage to the second liquid crystal layer to change a refractive index of the second liquid crystal layer. In a case where light is transmitted from the first optical wave guide to the second optical wave guide, the first optical switch portion is in a transmitting state, and the second optical switch portion is in a shielding state, and in another case where light is shielded from the first optical wave guide to the second optical wave guide, the first optical switch portion is in a shielding state, and the second optical switch portion is in a transmitting state.

In one embodiment, the first and second optical guides are made of light transmitting material having refractive indexes of $n_1$ and $n_2$, respectively, and the first and second liquid crystal layers include liquid crystal having refractive indexes of $n_{e1}$ and $n_{e2}$, respectively, and wherein when light is transmitted from the first optical wave guide to the second optical wave guide, the refractive indexes satisfy conditions of $n_1<n_{e1}<n_2$, and $n_2>n_{e2}$, and when light is shielded from the first optical wave guide to the second optical wave guide, the refractive indexes satisfy conditions of $n_1>n_{e1}$, $n_2>n_{e1}$, and $n_2<n_{e2}$, the refractive index $n_{e1}$ being smaller than that in the case where light is transmitted from the first optical wave guide to the second optical wave guide.

In another embodiment, the first and second optical guides are made of light transmitting material having refractive indices of $n_1$ and $n_2$, respectively, the first and second liquid crystal layers include liquid crystal having refractive indices of $n_{e1}$ and $n_{e2}$, respectively, and the first optical switch portion is a liquid crystal light directional coupler, and wherein when light is transmitted from the first optical wave guide to the second optical wave guide, the refractive indices satisfy conditions of $n_{e1}<n_1$, $n_{e1}<n_2$, and $n_2>n_{e2}$, and when light is shielded from the first optical wave guide to the second optical wave guide, the refractive indices satisfy conditions of $n_1>n_{e1}$, $n_2>n_{e1}$, and $n_2<n_{e2}$, the refractive index $n_{e1}$ being smaller than that in the case where light is transmitted from the first optical wave guide to the second optical wave guide.

In another embodiment, the first and the second optical switch portions include a first liquid crystal light directional coupler and a second liquid crystal light directional coupler, respectively, in the case where light is transmitted from the first optical wave guide to the second optical wave guide, the first liquid crystal light directional coupler being in a transmitting state, and the second liquid crystal light directional coupler being in a shielding state, in the another case where light is shielded from the first optical wave guide to the second optical wave guide, the first liquid crystal light directional coupler being in a shielding state, and the second liquid crystal light directional coupler being in a transmitting state.

In another embodiment, the first liquid crystal layer and the second liquid crystal layer are formed from one and the same liquid crystal layer in which liquid crystal molecules are uniformly oriented, and the second optical wave guide has a curved part between the first and second parts, whereby light transmission directions through the first part and the second part of the second optical wave guide are different from each other.

In another embodiment, the liquid crystal layer is made of a ferroelectric liquid crystal material.

According to another aspect of the invention, a liquid crystal light directional coupler is provided. In the liquid crystal light directional couper, the total mode numbers of a first optical wave guide and a second optical wave guide to be coupled to each other are in the range of from 2 to 5, respectively.

In one embodiment, wave-guiding modes in the first and second optical wave guides are selected to have mode numbers $m_1 = M_1 - 1$ and $m_2 = M_2 - 1$, respectively, which are the minimum propagation constants with respect to the total mode numbers $M_1$ and $M_2$ of the first and second optical wave guides.

According to another aspect of the invention, a liquid crystal light directional coupler is provided. In the liquid crystal light directional coupler, a first optical wave guide and a second optical wave guide each have a high refractive index portion and a low refractive index portion, a difference in refractive index between the high refractive index portion and the low refractive index portion being in the range of 0.01 to 0.05 both in the first and the second optical wave guides.

According to another aspect of the invention, a liquid crystal light directional coupler is provided. In the liquid crystal light directional coupler, at least one of two electrodes which sandwich a liquid crystal layer for applying voltage to the liquid crystal layer is divided into plural portions.

According to another aspect of the invention, a liquid crystal light directional coupler is provided. In the liquid crystal light directional coupler, a difference in refractive indices between a light transmitting state and a light shielding state of a liquid crystal layer is 0.02 or more.

According to another aspect of the invention, a liquid crystal light directional coupler is provided. For the liquid crystal light directional coupler, liquid crystal is selected to be ferroelectric liquid crystal, and a refractive index $n\perp$ along a shorter molecular axis direction of the ferroelectric liquid crystal has a condition of $n\perp < 1.50$ due to uniaxial approximation.

According to another aspect of the invention, a liquid crystal light directional coupler is provided. For the liquid crystal light directional coupler, liquid crystal is selected to be ferroelectric liquid crystal, and a product of a birefringence index $\Delta n = n\| - n\perp$ and a memory angle $2\omega$ satisfy a condition of $3.5$ (degree) $> \Delta n \cdot 2\omega > 1$ (degree), where $n\perp$ is a refractive index along a shorter molecular axis direction of the ferroelectric liquid crystal and $n\|$ is a refractive index along a longer molecular axis direction.

Thus, the invention described herein makes possible the following advantages:

(1) a wave guide type optical switch element using a liquid crystal having a high S/N ratio which will not be influenced by leakage light is realized;

(2) by curving an optical wave guide formed on a liquid crystal layer, an optical switch element having a simple configuration which is easily controlled can be fabricated;

(3) by using a ferroelectric liquid crystal, an optical switch element which operates at a high speed of about several microseconds can be fabricated;

(4) an optical switch element according to the invention is applicable to an optical integrated circuit, an active matrix type liquid crystal display apparatus of optical scanning system or the like;

(5) a light directional coupler having a reduced coupling length can be realized; and (6) since the coupling length of the light directional coupler is reduced, a matrix display device in which pixels are formed in high density can be realized by using the light directional coupler.

These and other advantages of the present invention will become apparent to those skilled in the art upon reading and understanding the following detailed description with reference to the accompanying figures.

DESCRIPTION OF THE PREFERRED EMBODIMENTS

Figure 1:
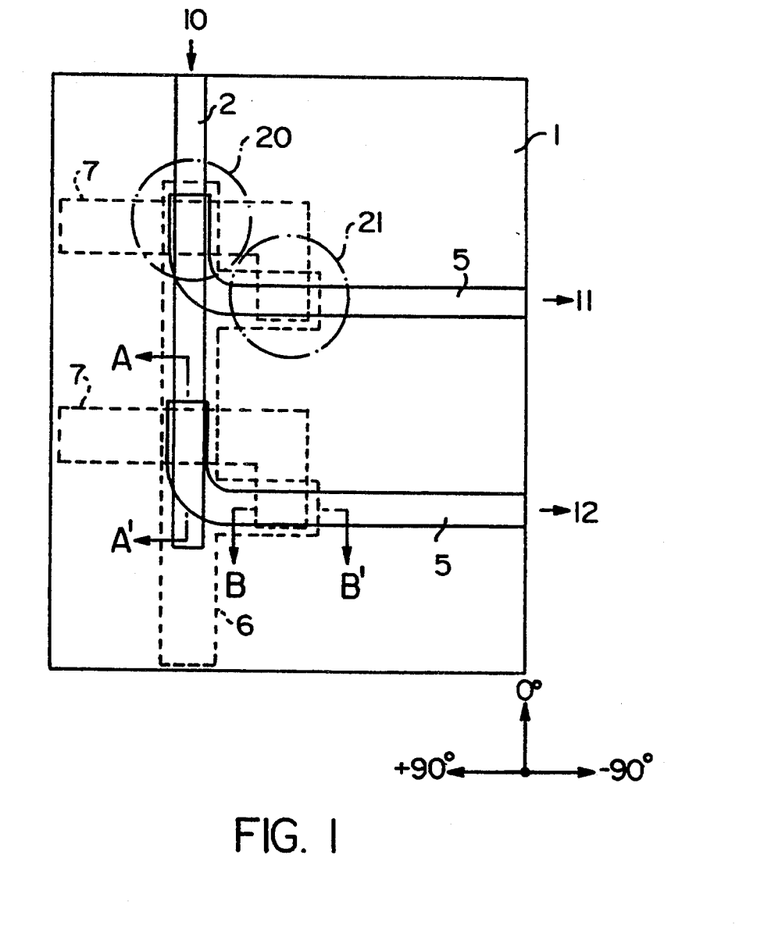
FIG. 1 is a plan view showing an example of an optical switch element according to the invention.

FIG. 1 is a plan view showing a structure of an optical switch element according to the invention. FIGS. 2A and 2B show a cross-sectional structure of the first optical switch portion 20 of the optical switch element taken along line A—A' of FIG. 1. FIGS. 2A and 2B also show a cross-sectional structure of the conventional optical switch element, as described above.

In FIG. 1, two optical switches are shown. A first optical wave guide 2 is formed on a glass substrate 1 in a stripe shape. A second optical wave guide 5 is formed on a glass substrate 4 which is not shown. The second optical wave guide 5 has a curved portion where it is curved at 90°. Between the glass substrates 1 and 4, a liquid crystal layer 3 (not shown) is provided. An end of the second optical wave guide 5 is optically connected to the first optical wave guide 2 via the liquid crystal layer 3. On the surfaces of the glass substrates 1 and 4 which are respectively in contact with the liquid crystal layer 3, a common electrode 6 and a segment electrode 7 are formed, respectively. The two electrodes are provided for applying voltage to the liquid crystal layer 3. A first optical switch portion 20 is constituted by a part of the first optical wave guide 2 where it is in contact with the common electrode 6, the common electrode 6, the liquid crystal layer 3, the segment electrode 7, and a part of the second optical wave guide 5 where it is in contact with the segment electrode 7. A second optical switch portion 21 is constituted by the common electrode 6, the liquid crystal layer 3, the segment electrode 7 and a part of the second optical wave guide 5 where it is in contact with the segment electrode 7.

The liquid crystal layer 3 has liquid crystal molecules which are oriented in one direction. A liquid crystal exhibits various refractive indexes depending on the incident angle with respect to the molecular axis of the liquid crystal. Therefore, a refractive index of the liquid crystal layer 3 is determined by the direction of light incident on the liquid crystal layer 3. In the optical switch element shown in FIG. 1, the light transmission direction in the second optical wave guide 5 is different between the first optical switch portion 20 and the second optical switch portion 21, so that the direction in which the light is incident on the liquid crystal layer 3 is also different therebetween. Therefore, for light beams which are transmitted through the first optical switch portion 20 and through the second optical switch portion 21, the liquid crystal layer 3 exhibits different refractive indexes.

Light 10 which is incident from one end of the first optical wave guide 2 is taken out of the second optical wave guide 5 at one end thereof as light beams 11 and 12, after the transmission through the first optical switch portion 20 and the second optical switch portion 21 of the optical switch element, and through the second optical wave guide 5.

As is shown in FIG. 2A, the first optical wave guide 2 is formed on the glass substrate 1. On a surface of the glass substrate 4, the second optical wave guide 5 is formed. On the surfaces of the glass substrates 1 and 4, the common electrode 6 and the segment electrode 7 are formed, respectively. To a space between the two glass substrates 1 and 4, liquid crystal is injected, so as to form the liquid crystal layer 3. Via the liquid crystal layer 3, the first optical wave guide 2 and the second optical wave guide 5 are optically connected to each other.

Figure 3A:
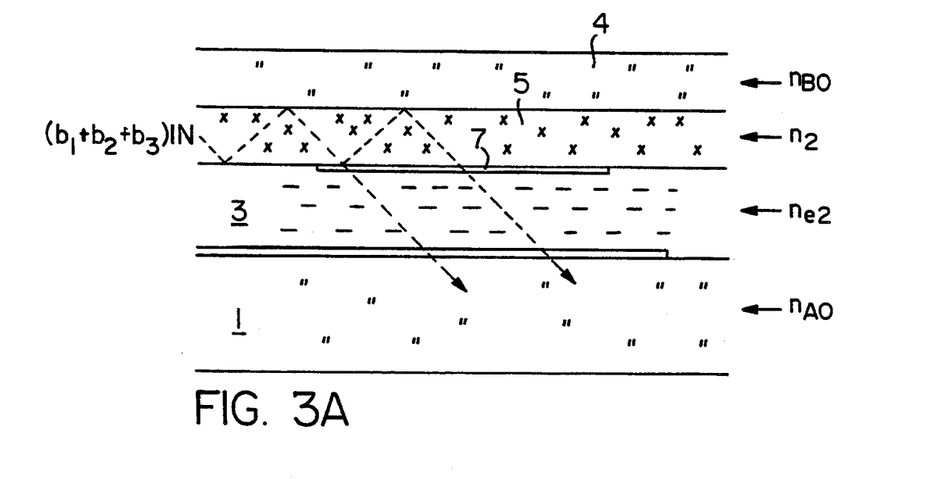
FIG. 3A is a cross-sectional view showing a structure of a second optical switch portion in one state of the optical switch element of FIG. 1.
Figure 3B:
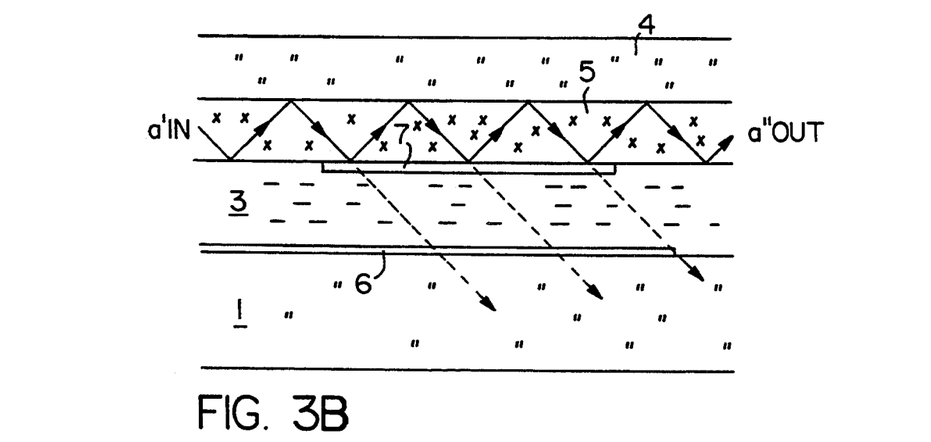
FIG. 3B is a cross-sectional view showing a structure of the second optical switch portion in another state of the optical switch element of FIG. 1.

FIGS. 3A and 3B show a cross-sectional structure of the second optical switch portion 21 of the optical switch element taken along line B—B' of FIG. 1.

As is shown in FIG. 3A, on the surface of the glass substrate 4, the second optical wave guide 5 is formed. On the surfaces of the glass substrates 1 and 4, the common electrode 6 and the segment electrode 7 are formed, respectively. To a space between the two glass substrates 1 and 4, liquid crystal is injected, so as to form the liquid crystal layer 3.

Hereinafter, referring to FIGS. 1, 2A, 2B, 3A and 3B, a method of fabricating the optical switch element according to the invention will be described.

An optical wave guide is formed on a substrate. For the substrate, a glass substrate made of soda lime, borosilicate glass, etc. having alkali oxide, a plastic substrate, or the like can be used. For example, in the case where the glass substrate is used, by selecting the composition of the glass substrate, a refractive index of the glass substrate can be selected in a range of 1.45 to 1.95. It is necessary to set a refractive index of the optical wave guide larger than that of the glass substrate which supports the optical wave guide by about 0.5 to 5%. A refractive index of the liquid crystal used in the optical switch element varies depending on the composition and the orientation direction of the liquid crystal molecule with respect to the optical axis. Normally, the refractive index of the liquid crystal falls within the range of about 1.45 to 1.8. Differences in refractive index in the same liquid crystal material caused by various orientation directions are about 0.1 to 0.2.

Figure 4:
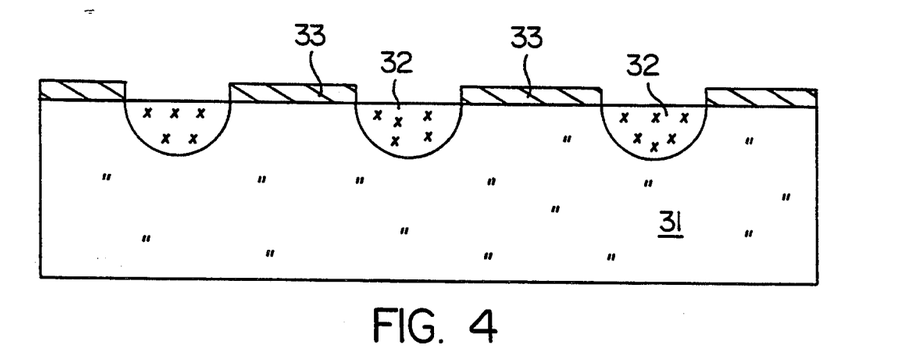
FIG. 4 is an explanatory view for a process for forming an optical wave guide.

FIG. 4 is a view for describing a process for forming an optical wave guide. Referring to FIG. 4, the process for forming the optical wave guide will be described. A surface of a glass substrate 31 is smoothed in such a manner that the difference in level of the surface is to be 0.1 $\mu$m or less. Then, a mask 33 made of a metal such as Ti or an oxide thereof is formed thereon. The surface of the glass substrate 31 should be smooth and flat in order that the uniformity of an electric field across the surface may be enhanced, that the surfaces of the optical wave guide to be formed may be smooth, and that the unnecessary scattering of light may possibly be eliminated for suppressing the attenuation of light. Into the glass substrate 31, ion species for increasing the refractive index are diffused by using a wet field ion exchanging method. An ion exchanging vessel is kept at 200° to 700° C. A platinum electrode is put into a solution in the ion exchanging vessel, so that an electric field is applied. As a result, ions of $Ag^+$, $Tl^+$, $K^+$ or the like are selectively diffused in the glass substrate 31 from the side of an anode. By the above process, a semi-circular high refractive index portion is formed in the glass substrate 31 as is shown in FIG. 4, which constitutes a desired optical wave guide 32. The optical wave guide 32 which is formed by the above process serves as each of the first and second optical wave guides 2 and 5 in this example.

In this example, the glass substrate 1 shown in FIGS. 1, 2A, 2B, 3A and 3B is made of FK1 glass (the refractive index $n_{A0}=1.47$). In the glass substrate 1, $Ag^+$ ions are diffused in required portions by using the wet field ion exchanging method. Thus, the first optical wave guide 2 of a stripe shape having the refractive index $n_1=1.52$ is formed to have a width of 50 $\mu$m and a depth of 50 $\mu$m. The glass substrate 4 is made of KzF1 glass (the refractive index $n_{B0}=1.55$). In the glass substrate 4, $Tl^+$ ions are diffused in required portions. Thus, the second optical wave guide 5 of a stripe shape having the refractive index of $n_2=1.58$ is formed to have a width of 50 to 70 $\mu$m, and a depth of 30 $\mu$m.

Next, $In_2O_3$ is deposited to have a thickness of 500 Å and patterned by photolithography and etching techniques, so as to form the transparent segment electrode 7 and the transparent common electrode 6, respectively, on the surface of the glass substrate 1 on which the first optical wave guide 2 is formed and on the surface of the glass substrate 4 on which the second optical wave guide 5 is formed. The refractive index of the $In_2O_3$ is about 2.00, but the thickness thereof is 1/10 or less compared with the wavelength of incident light. Therefore, the refractive index of the $In_2O_3$ does not affect the relationship between each of the first and second optical wave guides 2 and 5, and the liquid crystal layer 3 i.e., total reflection or scattering. In this example, for the simplicity of the fabrication, the liquid crystal layer 3 is formed so as to be in contact with the entire optical wave guides in the element. Alternatively, the liquid crystal layer 3 may be formed in parts of the first and second optical switch portions 20 and 21 through which light is transmitted.

Next, the formation of the liquid crystal layer 3 is described. First, for the orientation process toward a wall with which the liquid crystal molecules are in contact, $SiO_2$ is obliquely deposited. As a liquid crystal material, a ferroelectric liquid crystal {3M2CPOOB:(2s,3s)-3-methyl-2-chloropentanoic acid-4', 4"-octyloxybiphenylester; $n_1'=1.49$, $n_2'=1.60$} is used. The liquid crystal layer 3 functions as both a first liquid crystal layer for the first optical switch portion 20 and a second liquid crystal layer for the second optical switch portion 21. Regarding the liquid crystal material, the liquid crystal molecule is rotated by $\pm 30°$ with respect to the orientation axis depending on a direction of the applied electric field (a positive electric field, or a negative electric field). In other words, by changing the direction of the electric field, the orientation direction can be changed by 60°.

Table 1 shows the relationships among an initial orientation angle of the liquid crystal molecule of the liquid crystal material, an incident angle of light in the case of voltage application, and a refractive index. The initial orientation angle is an angle formed by the liquid crystal molecular axis which is parallel to the substrate and the first optical wave guide 2. When they are perpendicular, the initial orientation angle is 90°. The incident angle is measured in the same manner.

TABLE 1

| Initial orientation angle of liquid crystal molecule | negative voltage application | | positive voltage application | | |
|---|---|---|---|---|---|
| | incident angle | refractive index | incident angle | refractive index | |
| 20° | −10° | 1.493 | 50° | 1.552 | (Condition 1) |
| 30° | 0° | 1.490 | 60° | 1.570 | |
| 40° | 10° | 1.493 | 70° | 1.585 | |
| 50° | 20° | 1.501 | 80° | 1.596 | |
| 60° | 30° | 1.515 | 90° | 1.600 | |
| 70° | 40° | 1.532 | 100° | 1.596 | |
| 80° | 50° | 1.552 | 110° | 1.585 | |
| 90° | 60° | 1.570 | 120° | 1.570 | |
| 100° | 70° | 1.585 | 130° | 1.552 | |
| 110° | 80° | 1.596 | 140° | 1.532 | (Condition 2) |
| 120° | 90° | 1.600 | 150° | 1.515 | |

In Table 1, the refractive index in the case of negative voltage application is calculated on the basis of the following equation:

$$n_1 = [n_1'^2 \cdot n_2'^2 / \{n_2'^2 \cdot \sin^2(-60°) + n_1'^2 \cdot \cos^2(-60°)\}]^{\frac{1}{2}}$$

As is shown in Table 1, the refractive index of the liquid crystal for the incident light varies depending on the direction in which the light is incident on the liquid crystal with respect to the molecular axis of the liquid crystal.

In this example, liquid crystal is oriented in a direction having an angle of 20° with respect to the transmission direction of the incident light 10, i.e., a direction along the first optical wave guide 2. The liquid crystal is also oriented in such a manner that the longitudinal axes of the liquid crystal molecules are arranged in parallel to the glass substrate 1. Accordingly, for the first optical switch portion 20, a condition 1 in Table 1 is applied. In the first optical switch portion 20, when positive voltage is applied to the segment electrode 7, the liquid crystal molecules are oriented at 50° with respect to the incident angle of the light. The liquid crystal layer 3 exhibits a refractive index $n_{e1}$ of 1.552. When negative voltage is applied to the segment electrode 7, the liquid crystal molecules are oriented at −10°, and the liquid crystal layer 3 exhibits a refractive index $n_{e1}$ of 1.493.

On the other hand, in the second optical switch portion 21, the second optical wave guide 5 is curved by 90°, so that the transmission direction of light is changed by 90°. However, the direction of the molecular axis of the liquid crystal with respect to the glass substrate 1 is not changed. Therefore, for the second optical switch portion 21, a condition 2 in Table 1 is applied. When positive voltage is applied to the segment electrode 7, the liquid crystal layer 3 exhibits a refractive index $n_{e2}$ of 1.532. When negative voltage is applied, the liquid crystal layer 3 exhibits a refractive index $n_{e2}$ of 1.596.

In this example, in practice, light is incident on the liquid crystal layer 3 so as to have a mode angle of about 10° with respect to the thickness direction of the liquid crystal layer 3. This mode angle is sufficiently small so as not to largely vary the refractive index for the incident light.

Hereinafter, the operation of the optical switch element which satisfies the above conditions is described with reference to FIGS. 2A, 2B, 3A, 3B and Table 2.

TABLE 2

| State | Refractive Index | | | |
|---|---|---|---|---|
| | $n_1$ | $n_2$ | $n_{e1}$ | $n_{e2}$ |
| ON | 1.52 | 1.58 | 1.552 | 1.532 |
| OFF | 1.52 | 1.58 | 1.493 | 1.596 |

When positive voltage is applied to the segment electrode 7, the refractive indexes of the respective component materials have values in the ON-state section of Table 2. Since the refractive indexes satisfy a condition of $n_1 < n_{e1} < n_2$, light is transmitted from the first optical wave guide 2 to the second optical wave guide 5 in the first optical switch portion 20, as is shown in FIG. 2B. Also, the refractive indexes satisfy a condition of $n_{e2} < n_2$, so that the light guided into the second optical wave guide 5 is totally reflected repeatedly and is propagated through the second optical wave guide 5 in the second optical switch portion 21, as is shown in FIG. 3A. In other words, the light is shielded from the second optical wave guide 5 to a third optical wave guide (i.e., the glass substrate 1).

On the other hand, when negative voltage is applied to the segment electrode 7, the refractive indexes of the respective component materials have values in the OFF-state section of Table 2. Since the refractive indexes satisfy the conditions of $n_1 > n_{e1}$ and $n_{e1} < n_2$, the first optical wave guide 2 is optically shielded from the second optical wave guide 5 in the first optical switch portion 20, as is shown in FIG. 2A. Only leakage light ($b_1-b_3$) is transmitted from the first optical wave guide 2 to the second optical wave guide 5 and propagated through the second optical wave guide 5.

Also, the refractive indexes satisfy a condition of $n_2 < n_{e2}$, the leakage light ($b_1-b_3$) which is propagated through the second optical wave guide 5 is scattered out of the second optical wave guide 5 through the liquid crystal layer 3 in the optical switch portion 21, as is shown in FIG. 3A. In other words, the light is transmitted into the third optical wave guide. Therefore, the leakage light ($b_1-b_3$) from the first optical wave guide 2 will not be guided to the second optical wave guide 5. Thus, an S/N ratio of the optical switch element can be improved.

As described above, in the optical switch element according to the invention, the first optical switch portion functions as an inherent switch for controlling the transmission of light from the first optical wave guide to the second optical wave guide. The second optical switch portion functions in such a manner that, in the case where light is not allowed to be transmitted to the second optical wave guide, leakage light from the first optical wave guide to the second optical wave guide is not directly guided but transmitted through the second liquid crystal layer, so that the leakage light is transmitted out of the second optical wave guide 5.

As a result, the leakage light of 0.2% which conventionally causes problems can be removed in the second optical switch portion, so that unnecessary light will not be transmitted in the second optical wave guide.

A liquid crystal exhibits various refractive indexes depending on the incident angle with respect to the molecular axis of the liquid crystal. Accordingly, by arranging liquid crystal in different orientation directions in the first liquid crystal layer and in the second liquid crystal layer with respect to the second optical wave guide, $n_{e1}$ can have a different value from that of $n_{e2}$ without using different liquid crystal materials.

Especially, by using a ferroelectric liquid crystal, a refractive index largely varies by adjusting an angle formed by the molecular axis and the optical axis of light transmitted in the optical wave guide. At the same time, switching response speed is improved.

As described above, in the optical switch element of this example, two switch portions are operated by a single electrode, so that the optical switch element can be easily controlled and has a simple structure. Moreover, the first and second liquid crystal layers are constituted by the common liquid crystal layer 3, so that the optical switch element has a much simpler structure and hence it can readily be fabricated.

As a result of the study on the switching characteristic of the optical switch element of this example, it is found that the light transmitting efficiency is 35-40% of the incident light amount, and that the value of the extinction ratio can be 35 dB which is the limitation of the measurement system or more, while the light output is attenuated to be approximately half due to the curved wave guide between the two optical switch portions.

In this example, the second optical wave guide 5 is curved by 90°. Alternatively, the second optical wave guide 5 may be curved by another angle as far as the refractive indexes of the respective component materials of the optical switch element satisfy predetermined conditions. In view of the employed liquid crystal material, the angle may be a value other than 90°.

In this example, the first liquid crystal layer and the second liquid crystal layer are constituted by the common liquid crystal layer. Alternatively, the second liquid crystal layer may be constituted by using liquid crystal which is different from that in the first liquid crystal layer, as far as predetermined conditions of refractive indexes are satisfied. In this case, the light transmission direction through the second optical wave guide in the first optical switch portion may alternatively be the same as in the second optical switch portion.

Furthermore, it is effective that a light reflecting layer is formed on portions other than the transparent electrodes of the optical switch element, especially on the curved optical wave guide, for the purpose of protection, in order that the light in the optical wave guide will not be scattered in unwanted portions and attenuated.

In this example, when light is transmitted through the first and second optical switch portions 20 and 21, the refractive indices $n_1$, $n_{e1}$, $n_{e2}$, and $n_2$ of the first optical wave guide 2, the portions of the liquid crystal layer 3 corresponding to the first and second optical switch portions 20 and 21, and the second optical wave guide 5 should satisfy conditions of $n_1 < n_{e1} < n_2$ and $n_{e2} < n_2$. Alternatively, the invention has a modified example in which the refractive indices satisfy conditions of $n_{e1} < n_1$, $n_{e1} < n_2$, and $n_{e2} < n_2$.

Figure 5:
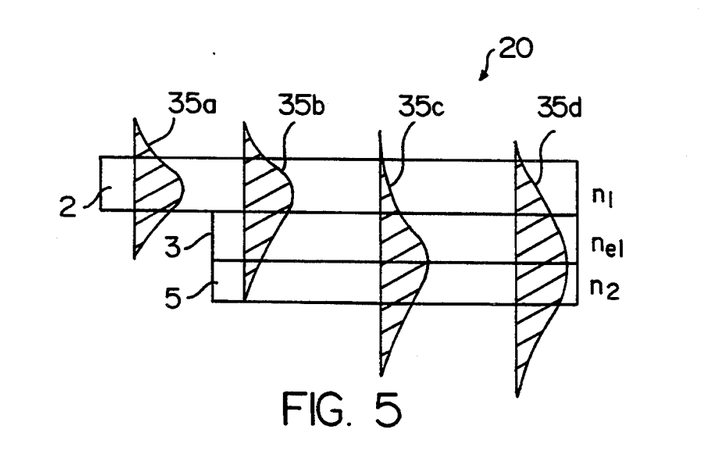
FIG. 5 is a cross-sectional view illustrating an electric field distribution of transmission light in one example of the invention.
Figure 6:
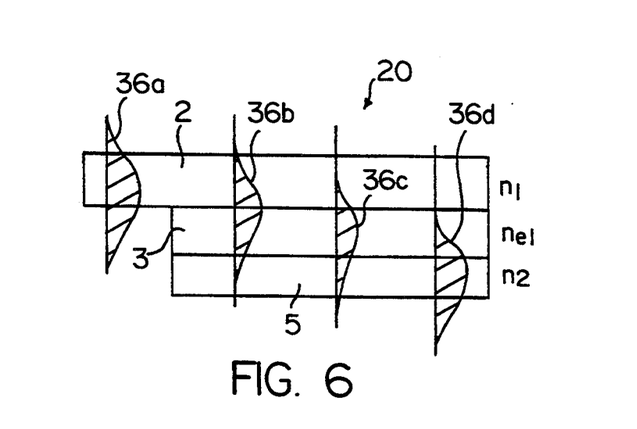
FIG. 6 is a cross-sectional view illustrating an electric field distribution of transmission light in another example of the invention.

Regarding the modified example, the manner of light transmission which is guided to the second optical wave guide 5 via the liquid crystal layer 3 will be described with reference to FIGS. 5 and 6. FIGS. 5 and 6 are exemplary cross-sectional views of the first optical switch portion 20. In the first optical switch portion 20, when the refractive indices $n_1$, $n_{e1}$ and $n_2$ have a condition of $n_1 < n_{e1} < n_2$, the light in the first optical wave guide 2 is guided to the second optical wave guide 5 via the liquid crystal layer 3, as described in the above example.

On the other hand, as the light was transmitted, the electric field distributions of light in the first optical wave guide 2, the liquid crystal layer 3 and the second optical wave guide 5 were observed as curves 35a, 35b, 35c and 35d in FIG. 5 by the inventors of this invention. More specifically, the electric field distribution changes during the light transmission from the first optical wave guide 2 to the second optical wave guide 5 in such a manner that the peak position of the electric field distribution is transited from the first optical wave guide 2 to the liquid crystal layer 3 and then to the second optical wave guide 5. However, at any position of the transition, the electric field distribution has a relatively high strength which cannot be neglected in the first optical wave guide 2, the liquid crystal layer 3 and the second optical wave guide 5.

Therefore, based on the above-mentioned condition, the intensity distribution of light which is transmitted from the first optical wave guide 2 to the second optical wave guide 5 via the liquid crystal layer 3 is diffused over the entire transmission region from the first optical wave guide 2 to the second optical wave guide 5.

On the contrary, in the case where the refractive indices $n_1$, $n_{e1}$, and $n_2$ were selected to satisfy the conditions of $n_{e1} < n_1$, and $n_{e1} < n_2$, as the light was transmitted, the electric field distributions of light in the first optical wave guide 2, the liquid crystal layer 3 and the second optical wave guide 5 were observed as curves 36a, 36b, 36c and 36d in FIG. 6 by the inventors of this invention.

Based on the directly above conditions of the refractive indices, the electric field distribution changes during the light transmission from the first optical wave guide 2 to the second optical wave guide 5 in such a manner that the peak position of the electric field distribution is transited from the first optical wave guide 2 to the liquid crystal layer 3 and then to the second optical wave guide 5. Moreover, when the peak position of the electric field distribution is moved in the order of the first optical wave guide 2, the liquid crystal layer 3 and the second optical wave guide 5, as compared with a specific element, e.g., the liquid crystal layer 3 in which the peak position of the electric field distribution exists, the other elements, e.g., the first and second optical wave guides 2 and 5 have a significantly lower intensity distribution, unlike the above example shown in FIG. 5.

Therefore, based on the conditions of refractive indices in the modified example, as the light is transmitted from the first optical wave guide 2 to the second optical wave guide 5 via the liquid crystal layer 3, the confinement state of light is transited in the order of the first optical wave guide 2, the liquid crystal layer 3, and the second optical wave guide 5. This proves that the coupling efficiency in the first optical switch portion 20 can be further improved than in the above example.

Another example of the invention is described below. This example is similar to the first example, so that like components are sometimes indicated by the same reference numerals as in the first example. In this example, one of the first and second optical switch portions 20 and 21 in the above first example is constructed as a liquid crystal light directional coupler (hereinafter, referred to simply as a coupler) having a construction which is described below. As a result, the coupling length in the optical switch portion 20 or 21 can be remarkably reduced as compared with the coupling length in the prior art. Hereinafter, it is assumed that the first optical switch portion 20 in the first example is constructed as a coupler 43. In this example, a minimum length required for moving the optical power of light transmitted through an optical wave guide to another optical wave guide is referred to as a coupling length.

Figure 8:
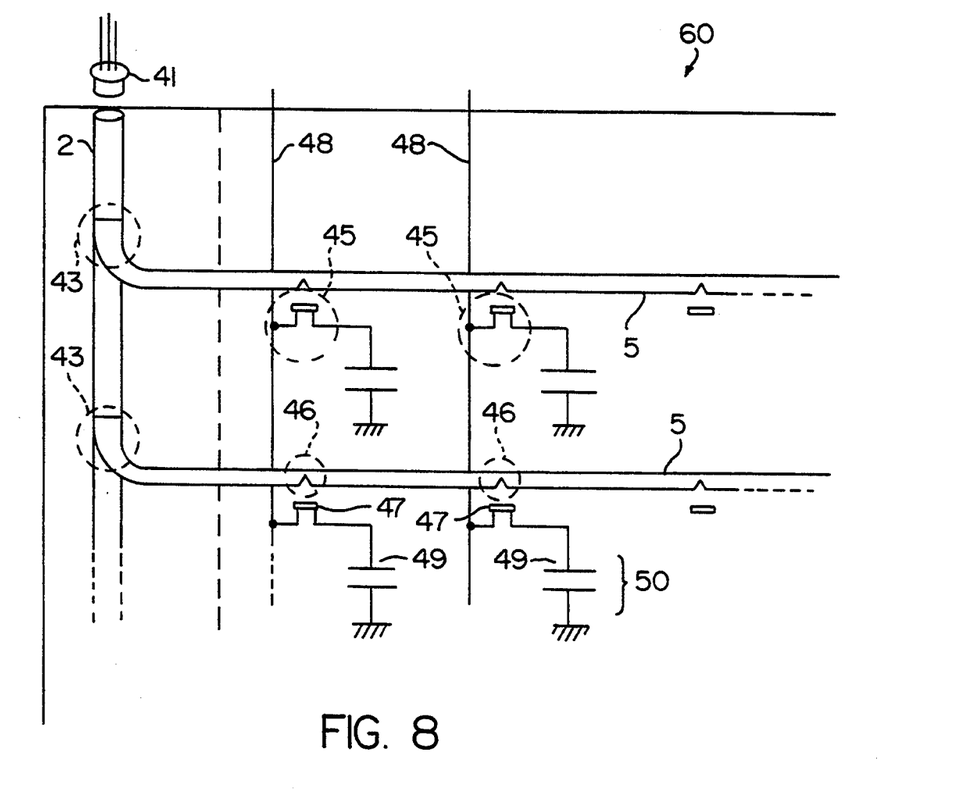
FIG. 8 is a plan view showing a display device in one example of the invention.
Figure 9:
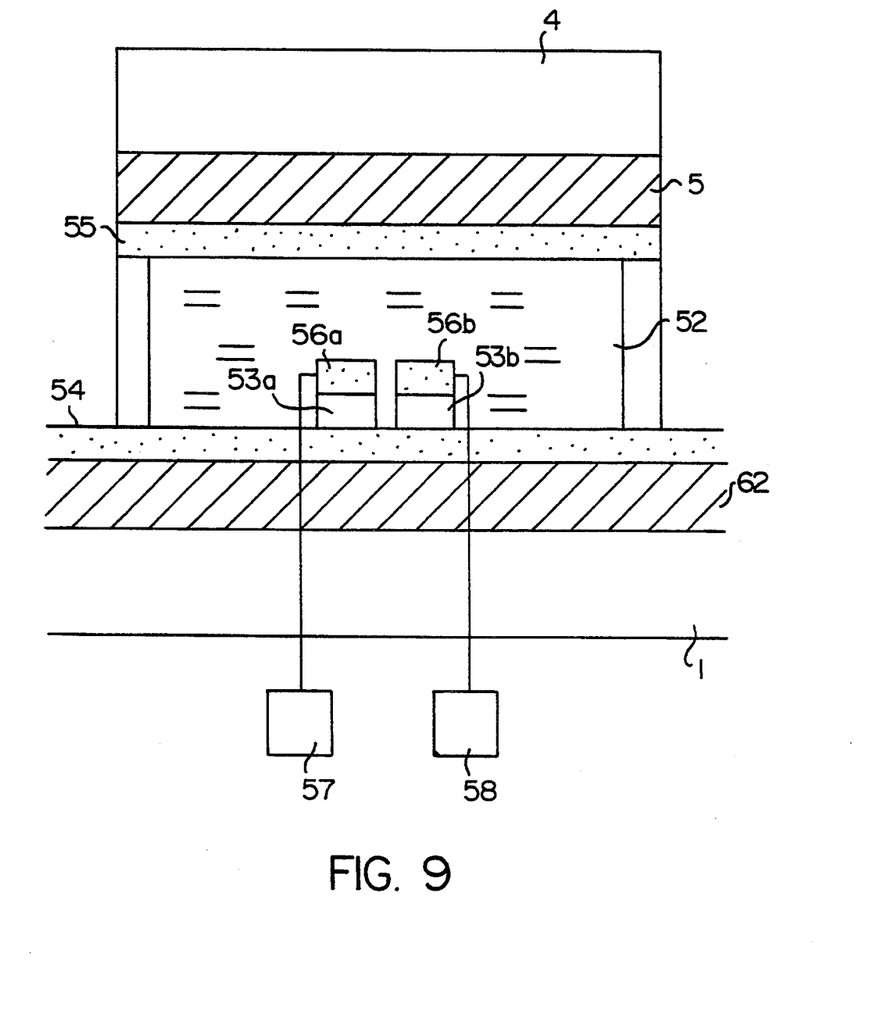
FIG. 9 is a cross-sectional view showing a light directional coupler in one example of the invention.

FIG. 8 is a plan view showing a large-sized liquid crystal display device (hereinafter, referred to as a display device) 60 using the coupler 43 of this example, and FIG. 9 is a cross-sectional view showing the coupler 43. As is shown in FIG. 8, the display device 60 includes a light source 41. The light source 41 includes a semiconductor laser or an LED (light emitting diode), and generates light for optical scanning. The light emitted from the light source 41 is guided into a first optical wave guide 2 extending along a column direction of the display device 60. For the polarization of light, a TE mode is selected. In addition, in a glass substrate 4, a plurality of row optical wave guides 5 extending along a row direction of the display device 60.

In the first optical wave guide 2, couplers 43 are provided. The number of the couplers 43 is the same as that of the plurality of row optical wave guides 5. By optically turning on a predetermined one of the plurality of couplers 43, the coupler 43 is selected. Via the selected coupler 43, almost all the light from the light source 41 is guided into, for example, one of the row optical wave guides 5. For performing the optical scanning in the display device 60 having the above construction, it is necessary to set the coupling length in the coupler 43 smaller than a pixel pitch of, for example, 1 mm which is required in terms of the resolution of the display image on the display device 60. For example, it is necessary to set the coupling length to be 1 mm or less.

The coupler 43 is constituted of: the first optical wave guide 2 formed on the glass substrate 1; the row optical wave guide 5 formed on the glass substrate 4; an electrode 54 which can transmit light in the first optical wave guide 2; an electrode 55 which can transmit light in the row optical wave guide 5; a ferroelectric liquid crystal 52 sandwiched between the electrodes 54 and 55; a plurality of insulating films 53a and 53b; and a plurality of division light transparent electrodes 56a and 56b formed on the insulating films 53a and 53b, respectively.

Such a coupler 43 can move the optical power existing in the first optical wave guide 2 to the second optical wave guide 5. In the coupler 43, when the refractive index of the liquid crystal 52 is large (in an on state), the optical power transition is performed. When the refractive index of the liquid crystal 52 is small (in an off state), the optical power transition is stopped.

A plurality of light scattering portions 46 are formed on each of the row optical wave guides 5. From the light scattering portions 46 which are provided on the row optical wave guide 5 into which the light is transmitted through the selected coupler 43, the light transmitted in the row optical wave guide 5 is emitted. The emitted light illuminates photo conductors 47 included in photoconductive switches 45. As a result, the photoconductive switches 45 are switched from the off state to the on state. Therefore, a display driving voltage which is determined by the contents to be displayed on the display device 60 is applied from plurality of signal lines 48 extending along the column direction to electrodes 49 via the photoconductive switches 45. The electrode 49 is one of the electrodes which constitute a pixel. As a result, an amount of charges corresponding to the display contents is accumulated in an equivalent capacitance 50 in a liquid crystal layer which is included in the pixel. After completing the scanning of the row optical wave guide 5, the photoconductive switch 45 is turned off. As a result, the charge accumulated in the equivalent capacitance 50 is held there until the next scanning timing of the row optical wave guide 5.

Next, the constructions of the display device 60 and the coupler 43 are described in more detail. In this example, as described above, the coupling length of the coupler 43 is set to be smaller than the pixel pitch in the display device 60. For example, the coupler 43 has a coupling length of 1 mm or less. However, the coupling length of the coupler 43 is not limited to 1 mm. In the display device 60, the coupler has a coupling length which is smaller than any pixel pitch which is determined based on a predetermined resolution of the display image.

In an example case where the coupling length of the coupler 43 is set to be a value of, for example, 1 mm or less, preferably be 0.5 mm, as is shown in FIG. 8, it is possible to form the row optical wave guides 5 with intervals of 1 mm or less on the glass substrate 4. Therefore, the light from the light source 41 is branched by couplers 43, so that the optical signal can be distributed to the respective row optical wave guide 5. In other words, if the coupling length of the coupler 43 is smaller than the intervals between the row optical wave guides 5, a trouble in which the row optical wave guides 5 adjacent to each other are superposed on each other in the coupler 43 can be prevented even when the row optical wave guides 5 are arranged with intervals of 1 mm or less.

In this example, in order to set the coupling length to a certain value, the coupler 43 is constructed in the following manner. A liquid crystal light directional coupler using ferroelectric liquid crystal uses the uniaxiality of refractive index of the ferroelectric liquid crystal. That is, as is shown in FIG. 10, a refractive index $n\perp$ in a shorter molecular axis direction is generally different from a refractive index $n\parallel$ in a longer molecular axis direction, so that the effective refractive index for extraordinary rays varies depending on the propagation direction of the extraordinary rays.

Figure 10:
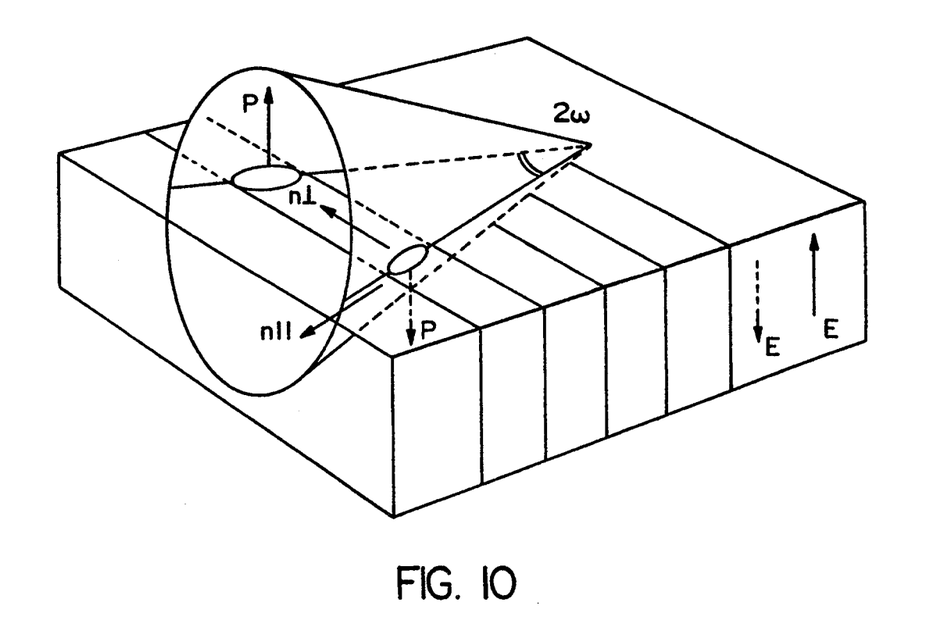
FIG. 10 is a perspective view showing a refractive index and orientation of liquid crystal.

Regarding the ferroelectric liquid crystal, as is shown in FIG. 10, the orientation direction of the liquid crystal molecules is tilt in the range of a memory angle $2\omega$ with respect to the normal of the layer, depending on the polarity of the applied voltage, i.e., depending on whether the field direction of the applied voltage is a first direction indicated by a solid line in FIG. 10 or is a second direction indicated by a broken line in FIG. 10. This means that the effective refractive index varies depending on the polarity of the applied voltage. The coupler 43 utilizes the electro-optical effect.

The inventors of this invention obtained the conditions under which the liquid crystal material, the optical characteristics of an optical wave guide, and the electrode construction are optimized, and the coupling length in the coupler 43 is reduced to a minimized value in this example. It is found by the inventors of the invention that the coupling length for two optical wave guides which are adjacent to each other is minimized when the optical wave guides are coupled by the modes having the orders of the propagation mode $m_1 = M_1 - 1$ and $m_2 = M_2 - 1$ with which the propagation constants are the smallest where $M_1$ and $M_2$ are the total numbers of propagation modes. That is, in the case where the total numbers of the propagation modes $M_1$ and $M_2$ are 3, the coupling length can be minimized by the mode coupling for the optical wave guides having the orders of the propagation mode $m_1 = m_2 = 2$.

The factors which cause the total number of the propagation mode M to change include a difference in refractive indices between optical wave guides, i.e., a difference in refractive indices between the glass substrate and the optical wave guide formed in the glass substrate in this example, the thickness of the wave guide, the wavelength of light and the like. In the case where the total number of the propagation modes M is 1 or 2, the difference in refractive indices between the optical wave guides is relatively small. For instance, in the case where the total number of the propagation modes M is 2 or more, the difference in refractive indices is 0.01 or more for the optical wave guide having a thickness of 4 $\mu$m. On the other hand, in order to set the total number of the propagation modes is set to be 6 or more, it is necessary to increase the difference in refractive indices between the optical wave guides in an example case where the thicknesses of the optical wave guides are equal to each other. However, the fabrication process for increasing the refractive index difference between the optical wave guides cannot be actually performed due to technical difficulties.

In addition, the total number of the propagation modes M becomes larger, as the optical wave guide is made thicker. In this case, as described above, the coupling length of the optical wave guides having the order of the propagation mode $m = M - 1$ is the minimum one.

The coupling length of the coupler 43 has a close relationship with the order of the propagation mode m of the light propagated through the optical wave guide. Specifically, when the order of the propagation mode m is small, the coupling length becomes relatively large. Therefore, in order to reduce the coupling length, it is necessary to increase the order of the propagation mode to a maximum value. On the contrary, in the actual fabrication process of the optical wave guide, there are restrictions such as the materials of the glass substrate and the optical wave guide, the thickness of the glass substrate, so that the desired refractive indices and the desired thickness of the optical wave guide cannot be sometimes realized. In this example, the total mode number M of the optical wave guides 2 and 5 to be coupled is selected as being 2 or more and 5 or less. In the case where the total mode number M is 1, the mode number $m = M - 1$ cannot be realized. In the case of the mode number $m = M - 1$, the optical propagation constant is smallest. In the case where the total mode number M is more than 5, it is necessary to form an optical wave guide with an extremely high refractive index. It is difficult to fabricate such an optical wave guide. By increasing the thickness of the optical wave guide in the glass substrate, the total mode number can increase. In this case, a new problem occurs such that the coupling length of the optical wave guides to be coupled to each other increases.

In order to use the coupler 43 in the optical scanning in the display device 60 on which an image is to be displayed with high resolution, as described above, it is necessary to set the coupling length to be smaller than the pixel pitch, for example, be 1 mm or less. For this purpose, it is necessary that a refractive index difference between a high refractive index portion of the optical wave guide, i.e., a high refractive index optical wave guide which is formed by ion implantation into a glass substrate or the like and a low refractive index portion, i.e., the glass substrate is set to be 0.01 or more for the optical wave guides with 4 $\mu$m thickness.

In this example, the refractive index of the high refractive index portion of the first optical wave guide 2 is selected to be, e.g., 1.53, and the refractive index of the low refractive index portion, i.e., the glass substrate 1 is selected to be, e.g., 1.52. Accordingly, the difference in refractive indices is 0.01. It was confirmed that it was possible to set the total total number of the propagation modes M to be 2 by the selection of such refractive index values. In this case, the thickness of the first optical wave guide 2 was determined to be 4 $\mu$m. If the refractive index difference for the first optical wave guide 2 is small, as described above, the total total number of the propagation modes M can be increased by increasing the thickness of the first optical wave guide 2. However, in this example, it was confirmed that the coupling length could not be reduced. The respective refractive indices of the glass substrate 1 and the first optical wave guide 2 in the glass substrate 1 are set to be, e.g., 1.52 and 1.54, respectively. Thus, the difference in refractive indices is 0.02. In this case, the total total number of the propagation modes M could be 3 without increasing the thickness of the first optical wave guide 2. In this case, as compared with the case where the refractive index difference is 0.01, the coupling length in the coupler 43 can be made smaller. In the present invention, each of the optical wave guides 2 and 5 has a high refractive index portion and a low refractive index portion. The high refractive index portion is the optical wave guides 2 and 5, and the low refractive index portion is the glass substrates 1 and 4. In this example, the difference in the refractive indices between the high refractive index portion and the low refractive index portion is defined as being 0.01 or more and 0.05 or less. In the case where the difference in the refractive indices is less than 0.01, the total mode number is less than 2. Accordingly, the coupling length cannot decrease. In the case where the difference in the refractive indices is more than 0.05, it is difficult to form the optical wave guide as a high refractive index portion in the glass substrate as a low refractive index portion in such a manner that such a difference in refractive indices is realized. It is because no dopant is known to form a high refractive index portion with a refractive index which is larger than that of the glass substrate by a difference more than 0.05.

By appropriately selecting the combination of the construction and the material of the coupler 43 so that the coupler 43 shields the optical power transition when voltage is not applied (normally off), the power consumption as the switching element can be suppressed. In this case, when an image is to be displayed, the on/off state of the coupler 43 only have to be controlled in synchronism with the image signal. Therefore, the control of the coupler 43 as a switching element can be readily performed. Due to the inherent orientation direction of the liquid crystal molecules in the ferroelectric liquid crystal 52, the above-mentioned normally off state can be realized.

As a result, as is shown in FIG. 9, an electrode on at least one of the glass substrates 1 and 4 is divided into a plurality of portions. Specifically, as is shown in FIG. 9, after forming the insulating films 53a and 53b on the electrode 54, division electrodes 56a and 56b are formed on the insulating films 53a and 53b, respectively. To the division electrodes 56a and 56b which are thus separately formed, potentials which are different from each other are applied independently. For this purpose, voltage generating circuits 57 and 58 are connected to the division electrodes 56a and 56b, respectively.

By applying voltages to the division electrodes 56a and 56b so that the refractive index of the ferroelectric liquid crystal 52 with voltage application is lower than that with no voltage application, the normally off state can be realized in the case of no electric field due to the memory effect of the ferroelectric liquid crystal 52. As a result, by switching between the positive and the negative voltage applied to the respective division electrodes 56a and 56b which are located at a central position along the column direction of the couplers 43 in FIG. 9 (in the transverse direction of FIG. 9), the on/off control of the coupler 43 can be performed.

In this example, the length of each of the division electrodes 56a and 56b at the central position in FIG. 9 of the coupler 43 was set to be 0.25 mm. This length is equal to the half of the coupling length in the coupler 43. The pixel pitch is, e.g., 1 mm, and the thickness of the liquid crystal cell is 2 $\mu$m.

If the division electrodes 56a and 56b shown in FIG. 9 are further divided into portions, the coupling efficiency between the optical wave guides 2 and 5 can be improved. The ratio of light intensity through the coupler 43 when the coupler 43 is turned on and off is referred to as an on/off ratio. When the two division electrodes were used as in this example, the on/off ratio was 100 or more.

In order to set the on/off ratio to be 100 or more in the coupler 43, it is necessary to select the effective refractive index difference during driving to be larger than 0.02. It was confirmed that, if the effective refractive index difference was smaller than 0.02, the on/off ratio was 100 or less.

It was confirmed by the inventors of this invention that in order to have such a large difference in effective refractive indices between the on state and the off state of the ferroelectric liquid crystal 52, it was necessary that the refractive index $n\perp$ was lower than 1.50, and a product of $\Delta n \cdot 2\omega$ of the birefringence index $\Delta n = n \| - n\perp$ and the memory angle $2\omega$ was larger than 1 (deg) and smaller than 3.5 (deg). In the display device 60, in the on state of the ferroelectric liquid crystal 52, the effective refractive index is 1.52, and in the off state, the effective refractive index is 1.49. The birefringence index $\Delta n = 0.14$, and the memory angle is 12°.

The advantage of the coupler 43 with the division electrodes 56a and 56b is in that when the light is propagated through the first optical wave guide 2 and reaches the liquid crystal region from a region which is in contact with the air, the light scattering caused by the spatial variation in the propagation mode of light can be suppressed. Therefore, the optical loss in the coupler 43 can be suppressed.

When the light is further transmitted, a refractive index of liquid crystal, especially a refractive index $n\perp$ in a shorter molecular axis direction of the liquid crystal, and a difference in refractive indices between the on and off states become significant factors, in order to increase the on/off ratio of the optical power, i.e., the optical intensity ratio by the on/off switching of the coupler 43. By appropriately selecting a material so that a value of a refractive index and a value of a product of a birefringence index and a memory angle are both set in predetermined ranges, the values of the refractive index $n\perp$ and the refractive index difference are realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical switch element for selectively transmitting or shielding light from a first optical wave guide to a second optical wave guide, said optical switch element comprising:
   said first optical wave guide;
   said second optical wave guide partially overlapping said first optical wave guide;
   a first optical switch portion formed at a portion where said first optical wave guide and said second optical wave guide are overlapped with each other, said first optical switch portion including a part of said first optical wave guide, a part of said second optical wave guide, and a first liquid crystal layer interposed between said part of said first optical wave guide and said part of said second optical wave guide;
   first voltage applying means for applying voltage to said first liquid crystal layer to change a refractive index of said first liquid crystal layer in order to control the transmission of light from said first optical wave guide to said second optical wave guide in accordance with a change of said refractive index;

a second optical switch portion formed at an another part of said second wave guide, said second optical switch portion including said another part of said second option wave guide, a second liquid crystal layer formed at said another part of said second optical wave guide; and second voltage applying means for applying voltage to said second liquid crystal layer to change a refractive index of said second liquid crystal layer in order that leakage light penetrated through said first optical switch portion is transmitted out of said second optical wave guide, in a case where light is transmitted from said first optical wave guide to said second optical wave guide, said first optical switch portion being in a transmitting state, and said second optical switch portion being in a shielding state, and in another case where light is shielded from said first optical wave guide to said second optical wave guide, said first optical switch portion being in a shielding state, and said second optical switch portion being in a transmitting state.

2. An optical switch element according to claim 1, wherein said first and second optical guides are made of light transmitting material having refractive indexes of $n_1$ and $n_2$, respectively, and said first and second liquid crystal layers include liquid crystal having refractive indexes of $n_{e1}$ and $n_{e2}$, respectively, and wherein when light is transmitted from said first optical wave guide to said second optical wave guide, said refractive indexes satisfy conditions of $n_1 < n_{e1} < n_2$, and $n_2 > n_{e2}$, and when light is shielded from said first optical wave guide to said second optical wave guide, said refractive indexes satisfy conditions of $n_1 > n_{e1}$, $n_2 > n_{e1}$, and $n_2 < n_{e2}$, said refractive index $n_{e1}$ being smaller than that in said case where light is transmitted from said first optical wave guide to said second optical wave guide.

3. An optical switch element according to claim 1, wherein said first and second optical guides are made of light transmitting material having refractive indices of $n_1$ and $n_2$, respectively, said first and second liquid crystal layers include liquid crystal having refractive indices of $n_{e1}$ and $n_{e2}$, respectively, and said first optical switch portion is a liquid crystal light directional coupler, and wherein when light is transmitted from said first optical wave guide to said second optical wave guide, said refractive indices satisfy conditions of $n_{e1} < n_1$, $n_{e1} < n_2$, and $n_2 > n_{e2}$, and when light is shielded from said first optical wave guide to said second optical wave guide, said refractive indices satisfy conditions of $n_1 > n_{e1}$, $n_2 > n_{e1}$, and $n_2 < n_{e2}$, said refractive index $n_{e1}$ being smaller than that in said case where light is transmitted from said first optical wave guide to said second optical wave guide.

4. An optical switch element according to claim 1, wherein said first and said second optical switch portions include a first liquid crystal light directional coupler and a second liquid crystal light directional coupler, respectively, in said case where light is transmitted from said first optical wave guide to said second optical wave guide, said first liquid crystal light directional coupler being in a transmitting state, and said second liquid crystal light directional coupler being in a shielding state, in said another case where light is shielded from said first optical wave guide to said second optical wave guide, said first liquid crystal light directional coupler being in a shielding state, and said second liquid crystal light directional coupler being in a transmitting state.

5. An optical switch element according to claim 1, 2, 3 or 4, wherein said first liquid crystal layer and said second liquid crystal layer are formed from one and the same liquid crystal layer in which liquid crystal molecules are uniformly oriented, and the second optical wave guide has a curved part between said first and second parts, whereby light transmission directions through said first part and said second part of said second optical wave guide are different from each other.

6. An optical switch element according to claim 1, where said first liquid crystal layer and said second liquid crystal layer are made of a ferroelectric liquid crystal material.

7. A liquid crystal light directional coupler comprising:

a first optical wave guide;

a second optical wave guide;

a liquid crystal layer having an effective refractive index and interposed between a portion of said first optical wave guide and a portion of said second optical wave guide, said liquid crystal layer selectively transmitting or shielding light from said first optical wave guide to said second optical wave guide in accordance with a change of said effective refractive index; and voltage applying means for applying voltage to said liquid crystal layer to change said effective refractive index of said liquid crystal layer based on a polarity of said applied voltage, wherein the total numbers of propagation modes of said first optical wave guide and said second optical wave guide are in the range of from 2 to 5.

8. A liquid crystal light directional coupler according to claim 7, wherein wave-guiding modes in said first and second optical wave guides are selected to have orders of the propagation mode $m_1 = M_1 - 1$ and $m_2 = M_2 - 1$, respectively, which are the minimum propagation constants with respect to the total numbers of propagation modes $M_1$ and $M_2$ of said first and second optical wave guides.

9. A liquid crystal light directional coupler according to claim 7, wherein said first optical wave guide and said second optical wave guide each have a high refractive index portion and a low refractive index portion, a difference in refractive index between said high refractive index portion and said low refractive index portion being in the range of 0.01 to 0.05 both in said first and said second optical wave guides.

10. A liquid crystal light directional coupler comprising:

a first optical wave guide;

a second optical wave guide;

a liquid crystal layer having an effective refractive index and interposed between a portion of said first optical wave guide and a portion of said second optical wave guide, said liquid crystal layer selectively transmitting or shielding light from said first optical wave guide to said second optical wave guide in accordance with a change of said effective refractive index; and voltage applying means for applying voltage to said liquid crystal layer to change said effective refractive index of said liquid crystal layer based on a polarity of said applied voltage, wherein said voltage applying means includes a pair of electrodes sandwiching said liquid crystal layer, and wherein at least one of said electrodes is divided into plural portions.

11. A liquid crystal light directional coupler comprising:

a first optical wave guide;

a second optical wave guide;

a liquid crystal layer having an effective refractive index and interposed between a portion of said first optical wave guide and a portion of said second optical wave guide, said liquid crystal layer selectively transmitting or shielding light from said first optical wave guide to said second optical wave guide in accordance with a change of said effective refractive index; and voltage applying means for applying voltage to said liquid crystal layer to change said effective refractive index of said liquid crystal layer based on a polarity of said applied voltage, wherein a difference in refractive indices between a light transmitting state and a light shielding state of said liquid crystal layer is 0.02 or more.

12. A liquid crystal light directional coupler comprising:

a first optical wave guide;

a second optical wave guide;

a liquid crystal layer having an effective refractive index and interposed between a portion of said first optical wave guide and a portion of said second optical wave guide, said liquid crystal layer selectively transmitting or shielding light from said first optical wave guide to said second optical wave guide in accordance with a change of said effective refractive index; and voltage applying means for applying voltage to said liquid crystal layer to change said effective refractive index of said liquid crystal layer based on a polarity of said applied voltage, wherein said liquid crystal layer includes a ferroelectric liquid crystal, and wherein a refractive index $n\perp$ along a shorter molecular axis direction of said ferroelectric liquid crystal has a condition of $n\perp < 1.50$ due to uniaxial approximation.

13. A liquid crystal light directional coupler according to claim 12, wherein a product of a birefringence index $\Delta n = n\| - n\perp$ and a memory angle $2\omega$ satisfies a condition of $3.5 \text{ (degree)} > \Delta n \cdot 2\omega > 1 \text{ (degree)}$, where $n\perp$ is a refractive index along a shorter molecular axis direction of said ferroelectric liquid crystal and $n\|$ is a refractive index along a longer molecular axis direction.

* * * * *